United States Patent Office 3,156,740
Patented Nov. 10, 1964

---

3,156,740
THERMOSETTING MIXTURE OF A STYRENE-ACRYLIC ACID-EPOXIDE-CONTAINING COMPOUND AND AN AMINE-ALDEHYDE RESIN
George W. Bussell, Dearborn, Mich., assignor to Rinshed-Mason Company, Detroit, Mich., a corporation of Michigan
No Drawing. Filed May 28, 1962, Ser. No. 197,877
7 Claims. (Cl. 260—834)

This invention relates to thermosetting polymeric compositions and more particularly to a thermosetting mixture of a styrene-acrylic acid-epoxide-containing compound and an amine-aldehyde resin and the process for making the mixture.

This application is a continuation-in-part of my application Serial No. 862,778, filed December 30, 1959, now abandoned.

Attempts have heretofore been made to prepare a thermosetting acrylic resin composition. Such resins, when incorporated into coating compositions, form infusible, solvent insoluble films which are hard, adherent and flexible, have high initial gloss, and are not easily harmed by water, soap, grease, light and prolonged heat. They are desirable for protecting and decorating a wide variety of articles such as automobile bodies, refrigerators, washing machines and the like.

One proposed method for preparing a thermosetting, infusible, solvent insoluble polymeric material is described in United States Patent No. 2,604,457. This patent teaches preparing a copolymer based on at least 50% of styrene, and having at least 12.5% of an acrylic acid along with a minor amount of at least one other polymerizable ethylenically unsaturated compound having the ethylenic group as sole reactive group. This copolymer is subsequently cold mixed with an epoxide material, linear polymeric 4-vinylcyclohexane, an amino catalyst is added and the mixture is cured by heating.

Limitations in the above composition reside in the necessity for the use of a large proportion of styrene and an amino catalyst and also its usefulness in connection with only one specific epoxide material. It has been discovered according to the present invention that a thermoplastic, fusible, solvent soluble acrylic polymeric material may be prepared from an acrylic or methacrylic acid, styrene, another polymerizable monoethylenically unsaturated compound, and an epoxide-containing material, and that the polymeric material so prepared may be cured to an infusible, solvent insoluble polymer by the addition of an amine-aldehyde resin thereto.

The advantages of this novel composition reside in increased stability, the variety of physical and chemical properties obtainable through the use of the wide range of permissible proportions of styrene and other polymerizable ethylenically unsaturated compounds and through the use of a wide variety of epoxide-containing materials.

The concept of the present invention which permits these desirable results is that if an acrylic polymer is first reacted with a selected epoxide-containing material, it can subsequently be combined with an amine aldehyde resin and cured to a hard, tough and insoluble film by baking at elevated temperatures.

The acrylic polymer is modified by reaction with an epoxide-containing material to introduce reactive groups which will react with the amine aldehyde resin to produce the desired cure. In view of the fact that amine aldehyde resins will react and cure with hydroxyl groups, I have introduced hydroxyl groups into the acrylic polymer by chemically reacting the carboxyl group

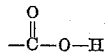

of the acrylic polymer with an epoxide group

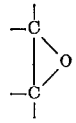

as shown by the following balanced chemical equation:

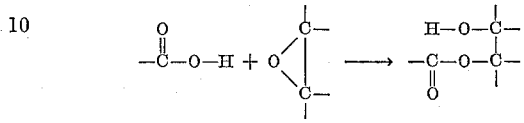

In order to prevent cross-linking between the epoxide-containing material and the acrylic polymer, the epoxide-containing material must have no more than one epoxy group which is readily reactive with a carboxyl group. Cross-linking is undesirable because it would result in gelation of the acrylic-epoxide compound and make it unusable for the intended purpose, which is the application thereof as a coating film.

It is consequently an object of the present invention to provide useful and novel acrylic polymeric materials.

A further object of the invention is to provide such polymeric materials which may have a wide variety of physical and chemical properties.

Another object is to provide a polymeric material which is stable and has a long shelf life.

In accordance with these objects, a thermosetting mixture is provided comprising (a) the reaction product of (1) a copolymer of an acid selected from the group consisting of acrylic acid and methacrylic acid, styrene, and another polymerizable monoethylenically unsaturated compound, and (2) an epoxide-containing compound containing the epoxide group

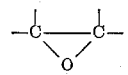

and (b) an amine-aldehyde resin.

The above mixture is prepared by first copolymerizing from 2.0 to 10.0% by weight of an acid selected from the group consisting of acrylic acid and methacrylic acid, from 4.5 to 88.0% by weight of styrene, and from 9.0 to 93.0% by weight of another polymerizable monoethylenically unsaturated compound. This copolymer is then heated with an epoxide-containing compound, the proportion of epoxide-containing compound to the copolymer being such that at least one epoxide group is present for each free carboxylic acid group of the copolymer. In some instances the epoxide-containing compound may be added during the copolymerizing step. For practical purposes, the upper limit of the epoxide groups appears to be two for each free acid group. The amine-aldehyde is then mixed into the copolymer in proportions of from 5.0 to 50.0% by weight based on the total non-volatile content of the mixture.

The ethylenically unsaturated compounds include any such compounds provided only that they are polymerizable. These compounds should contain the ethylenic group as sole reactive group with the other constituents of the acrylic copolymer. Illustrative compounds which can be used are acrylic, halo-acrylic, methacrylic esters and nitriles, such as for example, acrylonitrile, methyl methacrylate, butyl methacrylate, octyl methacrylate, methoxy-methyl methacrylate, chloroethyl methacrylate and the corresponding esters of acrylic and alpha-chloroacrylic acids; vinyl and vinylidene halides, e.g., vinyl chloride, vinyl fluoride, vinylidene chloride, vinylidene fluoride, vinyl carboxylates, e.g., vinyl acetate, vinyl chloroacetate, vinyl propionate and vinyl stearate; vinyl aryls, e.g., vinyl naphthalene; methyl vinyl ketone, and also the substituted styrenes, fumarates, maleates and the like.

The "epoxide-containing compound" may be a monomeric or polymeric compound containing the epoxide group,

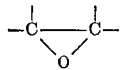

Suitable epoxide-containing compounds which may be substituted in the examples or used in other compositions of this invention include monomeric epoxides such as ethylene oxide, butylene oxide, epichlorohydrin, glycidol and ethyl glycidyl ether. A preferred group of epoxides includes 1-epoxyethyl-3,4-epoxycyclohexane, styrene oxide, 1,2-epoxy-4-vinylcyclohexane, 3,4-epoxycyclohexane carbonitrile, 3,4-epoxy-6-methylcyclohexylmethyl acetate, 2,3-epoxy-2-ethylhexanol, and ethyl 3,4-epoxy-2,5-endomethylene cyclohexoate. The preferred epoxide is 1-epoxyethyl-3,4-epoxycyclohexane.

As previously mentioned, the polymeric epoxide compound should contain only one epoxide group per molecule which is readily reactive under acidic conditions in order to reduce the amount of cross branching which produces a material having a tendency to gel. Monomeric epoxide compounds, of course, have only one epoxide group and are thus suitable for the invention. The polymeric epoxide compounds listed in the preferred group have only one epoxide group per molecule which is readily reactive under acidic conditions. For example, the preferred epoxide, 1-epoxyethyl-3,4-epoxycyclohexane, contains two epoxy groups, the epoxycyclohexane group and the epoxyethyl group. However, the epoxycyclohexane group is reactive under acidic conditions whereas the epoxyethyl group is reactive under basic conditions.

Another advantage is obtained by the use of the preferred epoxide materials as opposed to epoxide materials having two or more groups reactive under acidic conditions. The use of some of the latter type epoxide materials, particularly those based on epichlorohydrin and bisphenol-A, produces a material which when applied as a light colored film has a yellowish cast and additionally, tends to chalk.

It is desirable to carry the polymerization out using a high solvency naphtha as the solvent. The naphtha preferably has a boiling point between 350–425° F. This permits rapid polymerization at a high temperature to result in a polymeric material having a low molecular weight and tends to decrease the problem of gelation. However, a lower boiling point solvent, such as xylene (boiling point 266—286° F.) can also be used. When xylene is used, polymers of higher molecular weights are produced and longer times are required for the necessary reaction between the epoxide and acid radicals. Such high molecular weight polymers have one advantage in that they frequently are more resistant to film failure after the cure with an amine-aldehyde resin.

In some cases a mercaptan may be used where the polymeric material tends to gel because of a high molecular weight or for other reasons. In general, any of the well known polymerization processes may be used.

The amine-aldehyde resinous component of the invention is essential because the polymer will not cure satisfactorily without its addition. Amine-aldehyde resins are formed by the condensation of urea or melamine with formaldehyde followed by etherification or alkylation with butyl or other lower alcohols. Resins of this type are readily available as commercial materials and can be prepared by methods disclosed in the art, for example in "Polymer Processes," vol. X, by Shildknecht (see particularly Example 18, p. 347). Other examples are shown by experiments 31 and 32 and "Experimental Plastics and Resins," by G. F. D'Alelio. The following are two examples of suitable amine-aldehyde resins:

UREA-ALDEHYDE RESIN A 1090 gms. butyl formcel, 7 gms. morpholine, 376 gms. urea and 151 gms. butanol were heated to reflux (98° C.) and held for one hour. To this solution was then added 1.4 gms. phthalic anhydride dissolved in 8 gms. of ethanol. Refluxing was continued and the water evolved was replaced with butanol until 250 gms. of water had been removed and 250 gms. of butanol had been added. Heating was continued until a temperature of 114° C. was attained and a total of 280 gms. of water was evolved.

The temperature was then raised slowly and butanol distilled off until a temperature of 145° C. was attained and 380 gms. of butanol was removed. The resin solution was then diluted with 332 gms. of xylene and filtered.

MELAMINE-ALDEHYDE RESIN B 800 gms. of a 37% aqueous formaldehyde solution was adjusted to a pH of 8 with 3.00 cc. of a 20% water solution of sodium hydroxide. To this solution was then added 202 gms. melamine, 663 gms. to butyl alcohol, 1.25 gms. magnesium carbonate and 80 gms. of xylene.

The above mixture was heated to reflux and the removal of water was started. After a temperature of 90° C. was attained and 315 gms. of water were removed, 3 gms. of phthalic anhydride was added and refluxing continued until a total of 653 gms. of water was removed and a temperature of 110° C. was attained. The resin was then diluted with 183 gms. of butanol and filtered.

The following are examples of thermosetting mixtures prepared according to the invention:

Example I 29.2 gms. of styrene, 28 gms. of ethyl acrylate, 28 gms. of butyl acrylate and 4.8 gms. of methacrylic acid were copolymerized in 81.6 gms. of a high solvency naphtha (boiling point 347–428° F.) by heating to a reflux in the presence of 0.35 gms. di-tertiary-butyl peroxide. As the mono-ethylenically unsaturated compounds copolymerized, the temperature was raised gradually so as to maintain a slight reflux until a maximum reflux temperature of 384° F. was attained. Through a flow meter was then added 0.06 gm. of cumene hydroperoxide blended with 9.4 gms. of a high solvency naphtha. Heating at reflux was continued for a period of three hours. To the copolymer solution was added 10 gms. of 1-epoxyethyl-3,4-epoxycyclohexane and 10 gms. of a high solvency naphtha. The refluxing was maintained for a period of 2 hours. There was thus obtained a solution of a 29.2% styrene, 28% butyl acrylate, 28% ethyl acrylate, 4.8% methacrylic acid and 10% 1-epoxyethyl-3,4-epoxycyclohexane copolymer with an acid number of 8 calculated on the non-volatile portion of the vehicle.

To 25 gms. of the above solution, there was added 3.66 gms. of 60% non-volatile content amine-aldehyde resin solution B as previously described. A film was cast from this solution which, after heating at 400° F. for 10 minutes was insoluble in methyl ethyl ketone which is a solvent for the initial copolymer.

Insolubilization was not obtained by heating a film of the copolymer not containing the amine-aldehyde resin.

Example II 50 gms. styrene, 35 gms. ethyl acrylate and 4 gms. methacrylic acid were copolymerized in 82 gms. of a high solvency naphtha using 0.1 gms. tertiary-butyl perbenzoate and 0.3 gm. di-tertiary butyl peroxide as catalyst. After reaching a maximum reflux temperature of 380° F., 0.07 gm. of cumene hydro-peroxide blended with 7 gms. of a high solvency naphtha was added. Refluxing was continued for a period of three hours. To the copolymer solution was added a mixture of 11 gms. of 1-epoxyethyl-3,4-epoxycyclohexane and 11 gms. of a high solvency naphtha. Heating at reflux was continued for a period of two hours. There was thus obtained a copolymer solution with an acid value of 7.8 on the non-volatile portion of the vehicle indicating the diepoxide had chemically combined with the copolymer through the methacrylic acid radical.

To 25 gms. of the above copolymer solution was added 5.2 gms. of 60% non-volatile content amine-aldehyde resin solution B. A film was cast from this solution which after heating at 400° F. for ten minutes was insoluble in methyl ethyl ketone.

*Example III*

A copolymer containing 30% styrene, 30% ethyl acrylate, 27% butyl methacrylate, 4% methacrylic acid and 9% of 1-epoxyethyl-3,4-epoxycyclohexane was prepared by copolymerizing the styrene, ethyl acrylate, butyl methacrylate and methacrylic acid in 82 gms. of a high solvency naphtha at reflux temperatures in the presence of 0.4 gm. of di-tertiary butyl peroxide. As the polymerization progressed, the reflux temperature was raised until a maximum temperature of 385° F. was attained. To the copolymer solution was added a blend of 0.07 gm. cumene hydroperoxide and 9 gms. of a high solvency naphtha. After an additional refluxing period of three hours, a blend of 9 gms. of a high solvency naphtha and 9 gms. of 1-epoxyethyl-3,4-epoxyclcyohexane was added. Refluxing was continued for an additional two hours. There was thus obtained a copolymer solution with an acid value of 9.4 on the non-volatile portion of the copolymer.

To 25 gms. of the above copolymer solution was added 7.0 gms. of 60% non-volatile content amine-aldehyde resin solution B. A film was cast from this solution which after heating at 350° F. for thirty minutes was insoluble in methyl ethyl ketone.

*Example IV*

78.2 gms. styrene, 10 gms. ethyl methacrylate and 3.4 gms. methacrylic acid were heated to deflux in 84 gms. of a high solvency naphtha using 0.17 gm. di-tertiary butyl peroxide and 0.17 gm. cumene hydroperoxide as catalysts. As copolymerization proceeded, the temperature was raised slowly so as to maintain a moderate reflux until a constant refluxing temperature of 385° F. was attained. To the copolymer solution, a blend of 0.08 gm. of cumene hydroperoxide and 11 gms. of a high solvency naphtha was added and refluxing was continued for a period of three hours. A blend of 8.4 gms. 1-epoxyethyl-3,4-epoxycyclohexane and 5 gms. of a high solvency naphtha was then added and refluxing was continued for a period of two hours. Thus was obtained a copolymer solution with an acid value of 5.1 on the non-volatile portion of the copolymer.

To 25 gms. of the above solution was added 5.2 gms. of 60% non-volatile content amine-aldehyde resin solution B. A film was cast from this solution which after heating at 350° F. for thirty minutes was insoluble in methyl ethyl ketone.

*Example V*

78.2 gms. ethyl methacrylate, 10 gms. styrene and 3.4 gms. methacrylic acid were heated to reflux in 84 gms. of a high solvency naphtha using 0.17 gm. di-tertiary butyl peroxide and 0.17 gm. cumene hydroperoxide as catalysts. As copolymerization proceeded, the temperature was raised slowly so as to maintain a moderate reflux until a constant refluxing temperature of 375° F. was attained. To the copolymer solution, a blend of 0.08 gm. of cumene hydroperoxide and 11 gms. of a high solvency naphtha was added and refluxing was continued for a period of three hours. A blend of 8.4 gms. 1-epoxyethyl-3,4-epoxycyclohexane and 5 gms. of a high solvency naphtha was then added and refluxing was continued for a period of two hours. There was thus obtained a copolymer solution with an acid value of 5.4 on the non-volatile portion of the copolymer.

To 25 gms. of the above solution was added 5.2 gms. of 60% non-volatile content amine-aldehyde resin solution B. A film was cast from this solution which after heating at 350° F. for thirty minutes was insoluble in methyl ethyl ketone.

*Example VI*

29 gms. styrene, 57 gms. ethyl acrylate and 6 gms. methacrylic acid were copolymerized in 85 gms. of a high solvency naphtha using 0.2 gm. tertiary butyl perbenzoate and 0.2 gm. di-tertiary butyl peroxide as catalyst until a maximum refluxing temperature of 385° F. was attained. A blend of 0.08 gm. of cumene hydroperoxide and 10 gms. of a high solvency naphtha was then added and refluxing continued for a period of three hours. To the copolymer solution was then added a blend of 8 gms. of 1-epoxyethyl-3,4-epoxycyclohexane and 5 gms. of a high solvency naphtha and refluxing was continued for a period of two hours. There was thus obtained a copolymer solution with an acid value of 12.0 on the non-volatile portion of the copolymer.

To 25 gms. of the above copolymer was added 10.4 gms. of 60% non-volatile content amine-aldehyde resin solution B. A film was cast from this solution which after heating at 350° F. for thirty minutes was insoluble in methyl ethyl ketone.

*Example VII*

65 gms. styrene, 21 gms. butyl acrylate and 4 gms. methacrylic acid were copolymerized in 85 gms. of a high solvency naphtha using 0.1 gm. di-tertiary butyl peroxide and 0.3 gm. cumene hydroperoxide as catalysts. As the copolymerization proceeded, the temperature was increased so as to maintain a slight reflux until a maximum refluxing temperature of 385° F. was attained. A blend of 0.08 gm. cumene hydroperoxide and 5 gms. of a high solvency naphtha was then added and refluxing was continued for an additional three hours. To the above solution was then added a blend of 10 gms. of a high solvency naphtha and 10 gms. of 1-epoxyethyl-3,4-epoxycyclohexane and refluxing was contined for a period of two hours. There was thus obtained a copolymer solution with an acid value of 6.1 on the non-volatile portion of the copolymer.

To 25 gms. of the above copolymer was added 10.2 gms. of 60% non-volatile content amine-aldehyde type resin solution A. A film was cast from this solution which after heating at 400° F. for ten minutes was insoluble in methyl ethyl ketone.

*Example VIII*

70.0 gms. of ethyl methacrylate, 17.2 gms. of styrene, 4.0 gms. of methacrylic acid and 8.8 gms. of styrene oxide were co-reacted in 90.0 gms. of xylene (boiling point 266–286° F.) by heating to reflux in the presence of 0.35 gm. di-tertiary butyl peroxide. As the mono-ethylenically unsaturated compounds copolymerized, the temperature was raised gradually so as to maintain a slight reflux until a maximum reflux tempearture of 284° F. was attained. To this copolymer solution was then added 0.08 gm. of di-tertiary butyl peroxide blended with 10.0 gms. of xylene. Heating at reflux was continued for a period of five hours. There was thus obtained a copolymer solution with an acid value of 15 calculated on the non-volatile portion of the vehicle.

To 25 gms. of the above solution was added 2.4 gms. of a 60% non-volatile content amine-aldehyde resin solution B. A film cast from this solution which after heating at 400° F. for 10 minutes was insoluble in methyl ethyl ketone.

*Example IX*

70.0 gms. of styrene, 17.2 gms. of ethyl methacrylate, 4.0 gms. of methacrylic acid and 8.8 gms. of styrene oxide were co-reacted in 70.0 gms. of xylene by heating to reflux in the presence of 0.35 gm. di-tertiary butyl peroxide. As the mono-ethylenically unsaturated compounds co-reacted, the temperature was raised gradually so as to maintain a slight reflux until a maximum reflux temperature of 284° F. was attained. To this solution was then added 0.08 gm. of di-tertiary butyl peroxide blended with 10 gms. of xylene. Heating at reflux was continued for a period of five hours. 20 gms. of xylene was added to the copolymer solution and heating was discontinued. There was thus obtained a copolymer solution with an acid value of 16.8 calculated on the non-volatile portion of the vehicle.

To 25 gms. of the above solution was added 5.1 gms. of a 60% non-volatile content amine-aldehyde resin solution B. A film cast from this solution was insoluble in methyl ethyl ketone after curing at 400° F. for 10 minutes.

*Example X*

34.4 gms. of styrene, 52.6 gms. of butyl acrylate and 4.1 gms. of methacrylic acid were copolymerized in 50.5 gms. of xylene by heating to reflux in the presence of 0.25 gm. di-tertiary butyl peroxide. After refluxing at 284° F. for a period of four hours, there was added 0.08 gm. of di-tertiary butyl peroxide blended with 10.2 gms. of xylene. After further heating at reflux for one hour, there was added 8.9 gms. of 1,2-epoxy-4-vinylcyclohexane blended with 8.9 gms. of xylene. Heating was continued for a period of two and one-half hours. 30.4 gms. of xylene was then added to the copolymer solution and heating was discontinued. There was thus obtained a copolymer solution with an acid value of 16.4 on the non-volatile portion of the vehicle.

To 25 gms. of the above copolymer solution was added 7.0 gms. of a 60% non-volatile content amine-aldehyde resin solution B. A film cast from the above blend was insoluble in methyl ethyl ketone after heating at 400° F. for 10 minutes.

*Example XI*

70.0 gms. of ethyl methacrylate, 17.2 gms. of styrene and 4.0 gms. of methacrylic acid were copolymerized in 80.0 gms. of xylene by heating to reflux in the presence of 0.25 gm. of di-tertiary butyl peroxide and 0.10 gm. of tertiary butyl perbenzoate. As the mono-ethylenically unsaturated compounds copolymerized, the temperature was raised gradually so as to maintain a slight reflux until a temperature of 280° F. was attained. To the copolymer solution was then added 0.08 gm. of di-tertiary butyl peroxide blended with 10 gms. of xylene. Heating at reflux was continued for a period of one hour. There was then added 8.8 gms. of 1,2-epoxy-4-vinylcyclohexane blended with 10.0 gms. of xylene and heating at reflux was continued for a period of two hours. There was thus obtained a copolymer solution with an acid value of 19.2 on the non-volatile portion of the vehicle.

To 25 gms. of the above copolymer solution was added 3.66 gms. of a 60% non-volatile content amine-aldehyde resin solution B. A film cast from this solution was insoluble in methyl ethyl ketone after curing at 400° F. for 10 minutes.

*Example XII*

25.4 gms. of butyl acrylate, 25.4 gms. of ethyl acrylate, 27.5 gms. of styrene, 3.7 gms. of methacrylic acid and 18.0 gms. of 2,3-epoxy-2-ethylhexanol were co-reacted in 50 gms. of xylene in the presence of 0.22 gm. of di-tertiary butyl peroxide. As the reaction progressed, the temperature was raised gradually so as to maintain a slight reflux until a maximum reflux temperature of 284° F. was attained. 0.07 gm. of di-tertiary butyl peroxide blended with 10.0 gms. of xylene was then added to the copolymer solution and heating at reflux was continued for a period of three and one-half hours. 40.0 gms. of xylene was then added and heating was discontinued. There was thus obtained a copolymer solution with an acid value of 4.7 on the non-volatile portion of the vehicle.

To 25 gms. of the above copolymer solution was added 15.0 gms. of a 60% non-volatile content amine-aldehyde resin solution A. A film cast from this blend was insoluble in methyl ethyl ketone after curing at 400° F. for 10 minutes.

*Example XIII*

28.9 gms. of styrene, 28.9 gms. of ethyl acrylate, 28.9 gms. of butyl acrylate, 4.1 gms. of methacrylic acid and 9.2 gms. of 3,4-epoxycyclohexane carbonitrile were co-reacted in 51.7 gms. of a high solvency naphtha (boiling point 374–428° F.) by heating to reflux in the presence of 0.25 gm. di-tertiary butyl peroxide. As the reaction progressed, the temperature was raised gradually so as to maintain a slight reflux until a maximum reflux temperature of 384° F. was attained. To the copolymer solution was then added 0.08 gm. of cumene hydroperoxide blended with 10.3 gms. of a high solvency naphtha and refluxing was continued for a period of three hours. Heating was discontinued and 38.0 gms. of a high solvency naphtha was added. There was thus obtained a copolymer solution with an acid value of 4.9 on the non-volatile portion of the vehicle.

To 25.0 gms. of the above copolymer solution was added 7.0 gms. of a 60% non-volatile content amine-aldehyde resin solution B. A film cast from this blend was insoluble in methyl ethyl ketone after curing at 400° F. for 10 minutes.

*Example XIV*

27.6 gms. of styrene, 27.7 gms. of ethyl acrylate, 27.7 gms. of butyl acrylate, 4.0 gms. of methacrylic acid and 13.0 gms. of 3,4-epoxy-6-methylcyclohexylmethyl acetate were co-reacted in 49.3 gms. of a high solvency naphtha (boiling point 347–428° F.) by heating to reflux in the presence of 0.25 gm. of di-tertiary butyl peroxide. As the reaction progressed, the temperature was raised gradually so as to maintain a slight reflux until a maximum reflux temperature of 384° F. was attained. 0.08 gm. of cumene hydroperoxide blended with 9.9 gms. of a high solvency naphtha was then added and refluxing was continued at 384° F. for a period of three and one-half hours. Heating was discontinued and 40.8 gms. of a high solvency naphtha was added. There was thus obtained a copolymer solution with an acid value of 3.1 on the non-volatile portion of the vehicle.

To 25.0 gms of the above copolymer solution was added 8.8 gms. of a 60% non-volatile content amine-aldehyde resin solution B. A film cast from this blend was insolulbe in methyl ethyl ketone after curing at 400° F. for 10 minutes.

*Example XV*

27.6 gms. of styrene, 27.7 gms. of ethyl acrylate, 27.7 gms. of butyl acrylate, 4.0 gms. of methacrylic acid and 13.0 gms. of 3,4-epoxy-6-methylcyclohexylmethyl acetate were co-reacted in 49.3 gms. of xylene by heating to reflux in the presence of 0.16 gm of di-tertiary butyl peroxide and 0.08 gm. of tertiary butyl perbenzoate. As the reaction progressed, the temperature was raised gradually so as to maintain a slight reflux until a maximum reflux temperature of 284° F. was attained. 0.08 gm. of di-tertiary butyl peroxide blended with 9.9 gms. of xylene was then added and refluxing at 284° F. was continued for a period of three hours. Heating was discontinued and 40.8 gms. of xylene was added. There was thus obtained a copolymer solution with an acid value of 9.5 of the non-volatile portion of the vehicle.

To 25.0 gms. of the above copolymer solution was added 7.0 gms. of a 60% non-volatile content amine-aldehyde resin solution B. A film cast from this blend was insoluble in methyl ethyl ketone after curing at 400° F. for 10 minutes.

Example XVI 27.7 gms. of styrene 27.7 gms, of ethyl acrylate, 27.7 gms. butyl acrylate, 3.9 gms. of methacrylic acid and 13.0 gms. of ethyl 3,4-epoxy-2,5-endomethylene cyclohexoate were co-reacted in 49.5 gms. of xylene by heating to reflux in the presence of 0.16 gm. of di-tertiary butyl peroxide and 0.08 gm. of tertiary butyl perbenzoate. As the reaction progressed, the temperature was raised gradually so as to maintain a slight reflux until a maximum reflux temperature of 284° F. was attained. 0.08 gm. of di-tertiary butyl peroxide blended with 9.9 gms. of xylene was then added and refluxing at 284° F. was continued for a period of three hours. Heating was discontinued and 40.6 gms. of xylene was added. There was thus obtained a copolymer solution with an acid value of 16.0 on the non-volatile portion of the vehicle.

To 25.0 gms. of the above copolymer solution was added 8.8 gms. of a 60% non-volatile content amine-aldehyde resin solution B. A film cast from this blend was insoluble in methyl ethyl ketone after curing at 400° F. for 10 minutes.

The thermosetting mixture of the invention may be utilized in a variety of applications. They are useful, for instance, in manufacturing molded or cast articles or in the preparation of coating compositions. Pigments, fillers, plasticizers and other adjuvants may be added as desired to formulate useful end products.

Having thus described my invention, I claim:

1. A thermosetting mixture comprising (a) an amine-aldehyde resin blended with (b) the reaction product of (1) a copolymer of an acid selected from the group consisting of acrylic acid and methacrylic acid, styrene, and another polmerizable monoethylenically unsaturated compound, and (2) an epoxide-containing compound containing the epoxide group

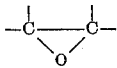

the proportion of epoxide-containing compound to the copolymer being such that from 1 to 2 epoxide groups are present for each free carboxylic acid group of the copolymer; said epoxide-containing compound having only one epoxide group which is readily reactive under acidic conditions.

2. A thermosetting mixture comprising (a) the reaction product of (1) a copolymer of from 2.0 to 10.0% by weight of an acid selected from the group consisting of acrylic acid and methacrylic acid, from 4.5 to 88.0% by weight of styrene, and from 9.0 to 93.0% by weight of another polymerizable monoethylenically unsaturated compound and (2) an epoxide-containing compound containing the epoxide group

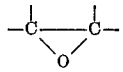

the proportion of epoxide-containing compound to said last mentioned copolymer being such that at least one epoxide group is present for each free carboxylic acid group of the copolymer; said epoxide-containing compound having only one epoxide group which is readily reactive under acidic conditions, blended with (b) an amine-aldehyde resin in an amount of from 5.0 to 50.0% by weight based on the total non-volatile content of the mixture.

3. A mixture as claimed in claim 2 and further characterized in that the epoxide-containing compound is a monomeric compound.

4. A mixture as claimed in claim 2 and further characterized in that the epoxide-containing compound is 1-epoxethyl-3,4-epoxycyclohexane.

5. The process of preparing a thermosetting mixture which comprises co-reacting (a) a copolymer of from 2.0 to 10.0% by weight of an acid selected from the group consisting of acrylic acid and methacrylic acid, from 4.5 to 88.0% by weight of styrene, from 9.0 to 93.0% by weight of another polymerizable monoethylenically unsaturated compound and (b) an epoxide-containing compound containing the epoxide group,

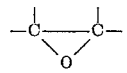

the proportion of epoxide-containing compound to said last mentioned copolymer being such that from 1 to 2 epoxide groups are present for each free carboxylic acid group of the copolymer; said epoxide-containing compound having only one epoxide group which is readily reactive under acidic conditions, and then mixing therein (c) an amine-aldehyde resin in an amount of from 5.0 to 50.0% by weight based on the total non-volatile content of the mixture.

6. The process as claimed in claim 5 and further characterized in that the epoxide-containing compound is 1-epoxyethyl-3,4-epoxycyclohexane.

7. The process as claimed in claim 5 and further characterized in that the epoxide-containing compound is a monomeric compound.

References Cited in the file of this patent

UNITED STATES PATENTS

| | | |
|---|---|---|
| 2,824,850 | Widmer et al. | Feb. 25, 1958 |
| 3,052,659 | Woodruff | Sept. 4, 1962 |
| 3,089,863 | Hicks et al. | May 14, 1963 |